O. EPPENSTEIN.
TELEMETER.
APPLICATION FILED JULY 5, 1912.

1,067,512.

Patented July 15, 1913.

Witnesses:
Paul Krüger
Fritz Sander

Inventor:
Otto Eppenstein

UNITED STATES PATENT OFFICE.

OTTO EPPENSTEIN, OF JENA, GERMANY, ASSIGNOR TO THE FIRM OF CARL ZEISS, OF JENA, GERMANY.

TELEMETER.

1,067,512.  Specification of Letters Patent.  Patented July 15, 1913.

Application filed July 5, 1912. Serial No. 707,904.

*To all whom it may concern:*

Be it known that I, OTTO EPPENSTEIN, a citizen of the German Empire, residing at Jena, Germany, have invented a new and useful Telemeter, of which the following is a specification.

The invention consists in an improvement in telemeters, which are composed of two telescopes and present both images for simultaneous monocular or binocular observation and the objective prisms of which are carried by an outer tube and the objective lenses of which along with the ocular prism system by an inner tube. According to the present invention this inner tube is to be capable of being adjusted in such a manner that there results a rotation in a plane perpendicular to the sighting plane and parallel to the base-line. Such a rotation displaces the two images in the direction perpendicular to the base-line, one image in the opposite direction to the other. This displacement can be utilized for the compensation of an error in the relative position of the images as to the direction mentioned, with a horizontal base-line, therefore, of a so-called height-error. In the case of a coincidence telemeter, one image of which is inverted and bounded above and below in horizontal lines by the other image, the said displacement of the images can also serve the purpose of bringing about a change of the locus of coincidence according to Patent 1,016,325.

It is not necessary to so dispose the adjusting device that the rotation of the inner tube caused by it takes place only in the plane mentioned. For when the rotation is made up of a partial rotation in that plane and of a simultaneous partial rotation parallel to the sighting plane, this latter partial rotation has no other influence on the course of the rays than a rotation of the entire instrument in the sighting plane.

In order that warping of the outer tube may not be transmitted to the inner tube, it is usual to journal the latter yieldingly at one end; to obtain the desired rotatability, it is then only necessary to fit at the other end as well of the inner tube an adjusting device, by means of which the inner tube is moved at this end in such a manner that a component of its path lies in a plane, which is perpendicular to the sighting plane and parallel to the base-line.

Figure 1:
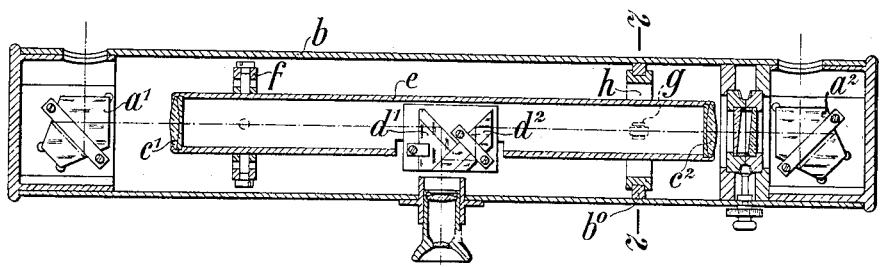
Figure 2:
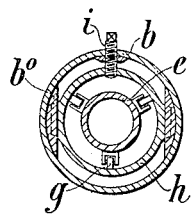
Figure 3:
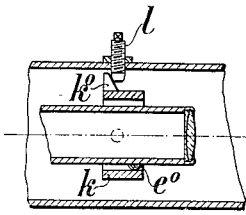
Figure 4:
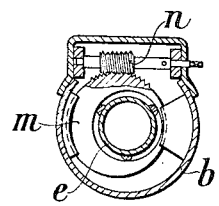

In the annexed drawing: Figure 1 is a horizontal axial section through a telemeter constructed according to the present invention. Fig. 2 is a cross-section on line 2—2 through the adjusting device of Fig. 1. Fig. 3 is a vertical axial section through another constructional form of the adjusting device. Fig. 4 is a cross-section through a third form of the adjusting device.

In the coincidence telemeter, Figs. 1 and 2, which presents two erect images, the objective prisms $a^1$, $a^2$ are journaled in the outer tube, $b$, the objective lenses $c^1$, $c^2$ and the separating prism system $d^1$, $d^2$ in the inner tube $e$. The inner tube is universally journaled at the left-hand end in the outer tube by means of the ring $f$, at the right-hand end it is journaled with three rollers $g$ in a ring $h$, which can be shifted on two guides $b^0$ perpendicularly to the sighting plane. In order to obtain an especially fine adjustment, the set-screw $i$ is formed as a differential screw.

In Fig. 3 the right-hand end of the inner tube rests with semiglobular projections $e^0$ in a ring $k$. This ring is journaled in the outer tube on an axis, which lies outside the plane of the projections $e^0$, in the sighting plane and perpendicular to the base-line. Through turning the set-screw $l$ the ring $k$ can be tilted by means of the wedge-shaped piece $k^0$ fixed to it and thereby the end of the inner tube raised and lowered.

In Fig. 4 the inner tube rests at the right-hand end in an eccentric ring $m$, which is rotatably journaled in the outer tube and may be adjusted by means of a worm $n$. The rotation of the inner tube is in this case made up of a partial rotation in a plane perpendicular to the sighting plane and parallel to the base-line and of a partial rotation in the sighting plane.

I claim:

In a telemeter comprising an ocular system, an ocular prism system, a measuring device, an outer tube carrying at either end an objective prism system and an inner tube carrying at either end an objective lens, the combination with the said outer tube and the said inner tube of means for causing a displacement of the said inner tube relatively to the said outer tube, at least a component of the path traced by the said inner tube during such displacement lying in a plane perpendicular to the sighting plane and parallel to the base-line.

OTTO EPPENSTEIN.

Witnesses:
PAUL KRÜGER,
FRITZ SANDER.